Figure 3:
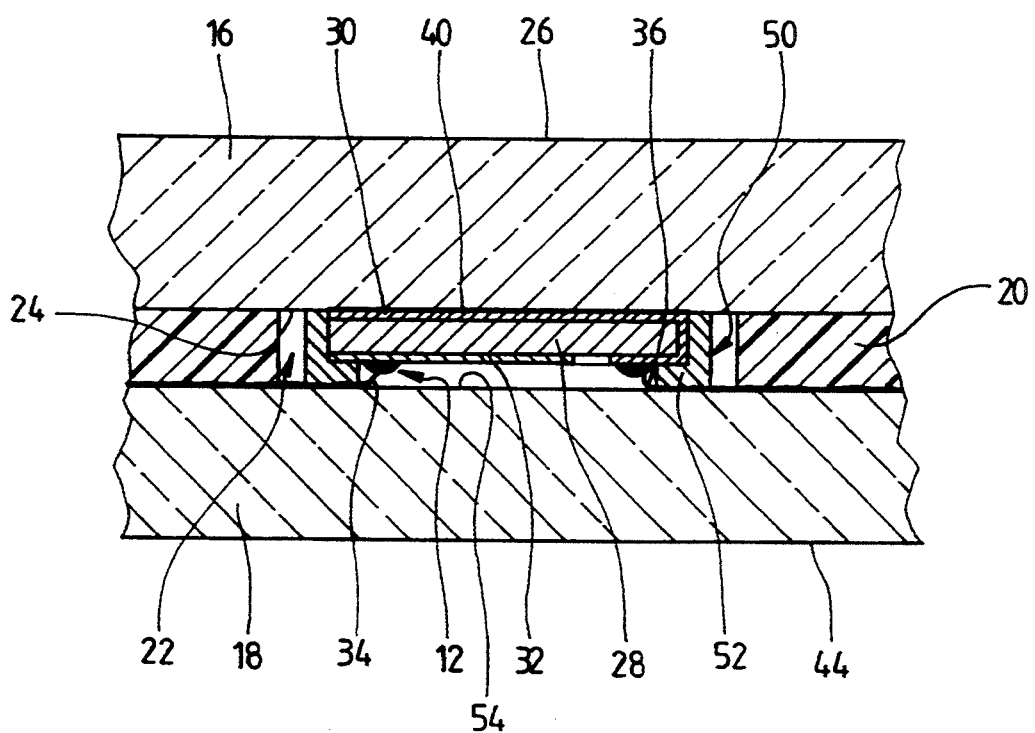

United States Patent [19]

Saurer et al.

[11] Patent Number: 5,436,060
[45] Date of Patent: Jul. 25, 1995

[54] WINDOW, NOTABLY AUTOMOBILE VEHICLE WINDSCREEN, INCLUDING AN INTEGRATED ULTRASONIC DEVICE FOR DETECTING THE PRESENCE OF FOREIGN BODIES ON ONE OF ITS FACES

[75] Inventors: Eric Saurer, Bevaix; Bernard Duthé, Chamblon; Roland Jeanmonod, Neuchâtel, all of Switzerland

[73] Assignee: Asulab S.A., Biel, Switzerland

[21] Appl. No.: 286,958

[22] Filed: Aug. 8, 1994

[30] Foreign Application Priority Data

Sep. 3, 1993 [FR] France ............... 93 10584

[51] Int. Cl.⁶ .................................. B32B 9/00
[52] U.S. Cl. ........................ 428/195; 428/34.4; 428/34; 428/45; 367/188; 310/322
[58] Field of Search .............. 428/209, 34.4, 195, 428/45, 46, 34, 38; 318/483; 340/550, 391.1; 310/322; 367/188

[56] References Cited

U.S. PATENT DOCUMENTS

| | | | |
|---|---|---|---|
| 4,827,198 | 5/1989 | Mueller et al. | 318/483 |
| 4,867,561 | 9/1989 | Fujii | 318/483 |
| 4,935,723 | 6/1990 | Vallance | 310/322 |
| 5,266,873 | 11/1993 | Arditi et al. | 318/483 |

FOREIGN PATENT DOCUMENTS 3528009 2/2987 Germany.

Primary Examiner—Patrick J. Ryan
Assistant Examiner—Patrick R. Jewik
Attorney, Agent, or Firm—Griffin, Bulter, Whisenhunt & Kurtossy

[57] ABSTRACT

The invention concerns a window including at least a first sheet (16), a second sheet (18), said sheets being joined together by a connecting layer (20), characterised in that it also includes an ultrasonic device (12) placed between said sheets (16,18) and co-operating directly with a first face (24) of said first sheet (16) to detect the presence of foreign bodies on a second face (26) of said first sheet (16) opposite said first face (24), said device (12) comprising a transducer (28) able to emit, via a transmitting/receiving face, an incidental ultrasonic signal of wavelength λ in said first sheet (16), the thickness of said first sheet being equal to K.λ/2, where K is an integral number, and said transducer being able to receive, via said transmitting/receiving face a reflected ultrasonic signal representative of the presence or absence of said foreign bodies to generate a detection signal.

10 Claims, 2 Drawing Sheets

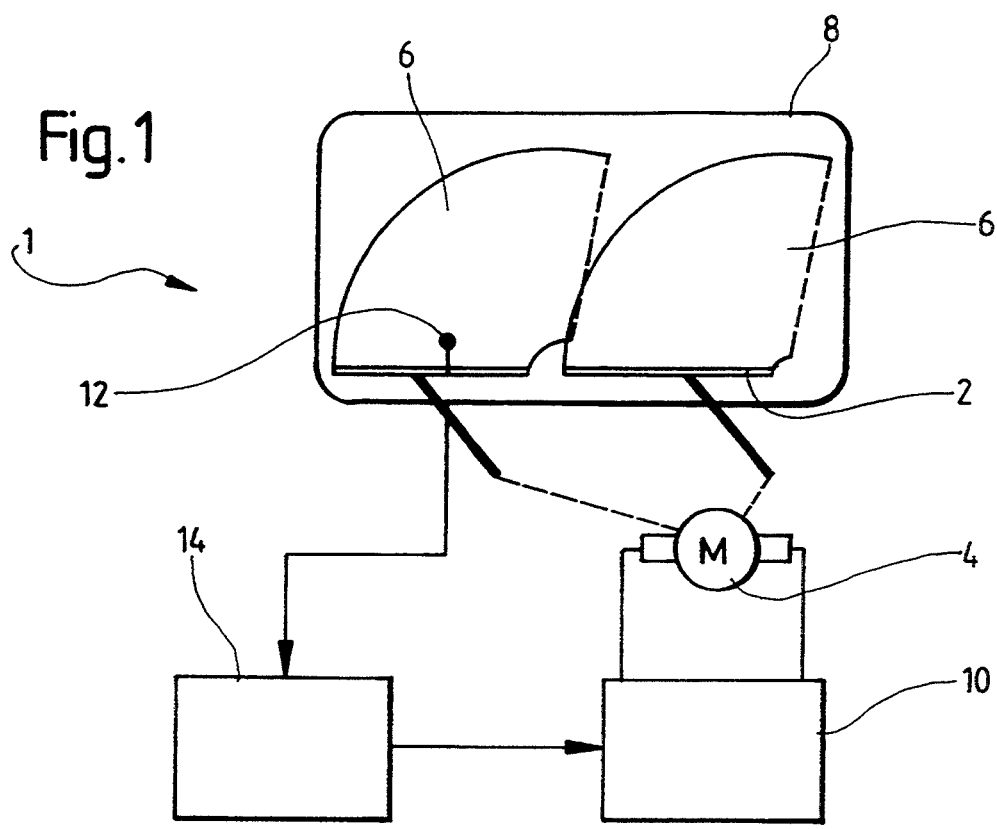
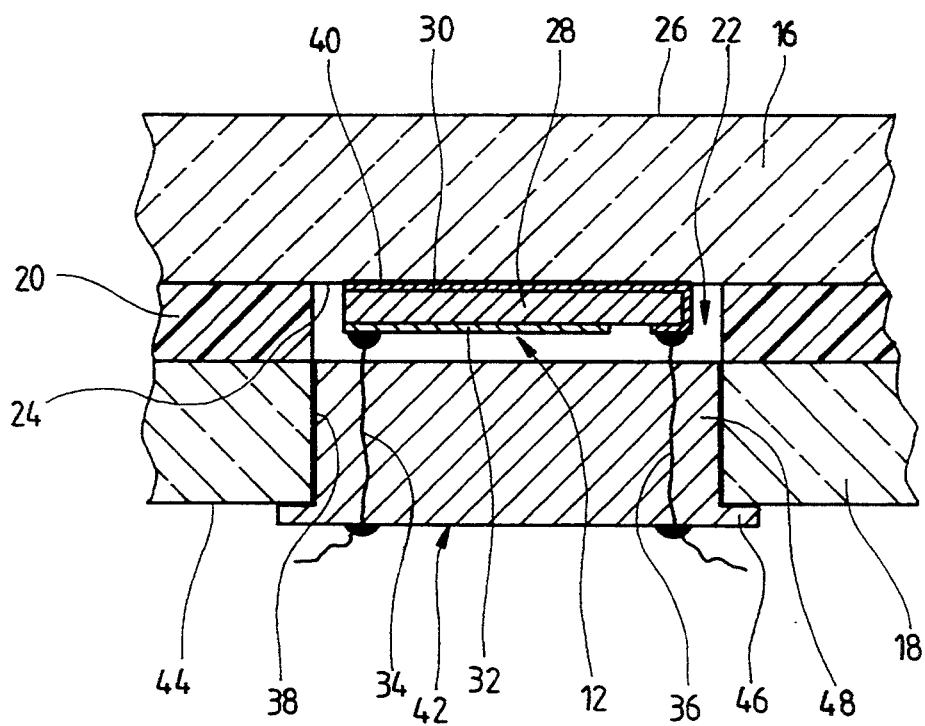

WINDOW, NOTABLY AUTOMOBILE VEHICLE WINDSCREEN, INCLUDING AN INTEGRATED ULTRASONIC DEVICE FOR DETECTING THE PRESENCE OF FOREIGN BODIES ON ONE OF ITS FACES

The invention concerns a window and more particularly, a windscreen including an integrated ultrasonic device for detecting the presence of foreign bodies on one of its faces.

Various devices for detecting the presence of foreign bodies on the surface of a window are already known. In most cases, advantage is taken of the fact that the transmission of a wave (optical, elastic or other wave) in the material of the window is affected by an alteration of the medium in which the window is located.

Thus, in the case of a windscreen of a motor vehicle, the amplitude of the echo of an ultrasonic signal propagating in the thickness of the windscreen and reflecting on the exterior face may be more or less attenuated as a function of the state of the surface of one of the wall surfaces of the windscreen. Detection of this variation in amplitude is thus representative of the presence of foreign bodies on the surface of the windscreen and consequently enables a usable control signal to be provided, for example for starting and stopping the operation of a cleaning device.

Patent application EP 0 512 653 proposes an automatically controlled cleaning device, in particular for motor vehicle windscreen, which uses this principle and in which an ultrasonic transducer effecting the functions of transmission and reception is directly fixed onto the interior surface of a windscreen.

This device operates in a satisfactory fashion when it is used with so-called symmetrical windscreens, that is to say comprising two sheets of glass of the same thickness joined together by a connecting layer such as a layer of polyvinyl butadiene (PVB).

When a transducer sets into vibration two sheets of glass joined together by a connecting layer (PVB layer), the transmission of the incidental wave across the sheet of glass directly in contact with the transducer is maximal when the thickness of that sheet is an integral multiple of the half wavelength of the incidental wave propagating in the sheet.

Further, in order to obtain optimal sensitivity to the detection of the presence of foreign bodies on the surface of the sheet of glass remote from the transducer, the vibration amplitude of that sheet of glass must be maximal. This condition is only achieved if the resonant frequency of the sheet of glass in question is approximately equal to the frequency of the wave emitted by the transducer or to an integral multiple of the latter. In other worlds, $f_1 = c/2e_1$ must equal K times $f = c/\lambda$, $f_1$ being the resonant frequency of the sheet remote from the transducer, c being the speed of the wave induced by the transducer in the glass, $e_1$ being the thickness of said sheet, f being the resonant frequency of the transducer, $\lambda$ being the wavelength of the signal emitted by the transducer in the glass and K a whole number. Consequently it can be seen that these conditions are fulfilled when $e_1 = K.\lambda/2$.

It can be seen therefore that it is easy, in the case of a symmetrical windscreen, to select a transducer emitting a signal whose wavelength is adapted to the identical thickness of each of the sheets of glass forming the windscreen.

On the other hand, it follows from the above that the optimal operating conditions of such a device are no longer fulfilled when the transducer is applied to an asymmetrical window or windscreen, that is to say comprising two sheets of glass of different thickness joined by a connecting layer such as a PVB layer.

As these asymmetrical windscreens equip a certain category of automobiles, it would also be advantageous to be able to fit such windscreens with an automatically controlled cleaning device such as that described in patent application EP 0 512 653.

An aim of the invention is thus to overcome the disadvantages of the aforementioned prior art by providing a window equipped with a device for ultrasonically detecting the presence of foreign bodies on one of its faces and which exhibits great detection sensitivity.

One aspect of the invention provides a window comprising at least a first sheet, a second sheet, said sheets being joined together by a connecting layer, characterised in that it also includes an ultrasonic detection device placed between said sheets and directly co-operating with a first face of said first sheet to detect the presence of foreign bodies on a second face of said first sheet opposite said first sheet, said device comprising a transducer able to emit, via a transmitting/receiving face, an incidental ultrasonic signal of wavelength $\lambda$ in said first sheet, the thickness of said first sheet being equal to $K.\lambda/2$ where K is an integral number, and said transducer being able to receive, via said transmitting/receiving face a reflected ultrasonic signal representative of the presence or absence of said foreign bodies to generate a detecting signal.

Due to these characteristics, the transmission of the ultrasonic wave is effected only across the first sheet so that the losses and disturbances induced by the connecting layer are avoided and it is thus easy to select a transducer emitting a signal whose wavelength in the glass is adapted to the thickness of the sheet of glass in the window with which it is directly in contact, namely, with the first sheet.

Other characteristics and advantages of the invention will appear more clearly upon reading the following description of several embodiments of the invention given purely by way of illustrative and non-limitative examples, said description being given in conjunction with the drawings in which:

FIG. 1 shows a general schematic diagram of an example of an automatically controlled windscreen cleaning system using a window according to the invention; and FIG. 2 is a schematic cross-sectional view of a first embodiment of a window according to the invention; and FIG. 3 is a schematic cross-sectional view of a second embodiment of the window according to the invention.

The description of the invention will be made in the framework of an advantageous application for the elimination of moist foreign bodies such as rain, snow, mud, etc. present on the surface of a window such as an asymmetrical motor vehicle windscreen.

The term windscreen or asymmetrical window will be used in the following description to mean a composite window comprising at least a first sheet of a first thickness, and a second sheet of a second thickness, the two sheets being joined together by a connecting layer which may be produced in the form of a full layer or a frame. The first and second thicknesses may be the same or different, as the case may be, but the invention exhibits greater advantages with sheets of different thicknesses for the reasons given above.

At the same time, it is self-evident that the invention is in no manner limited to this application and that it may be advantageously employed within the framework of any other application for the detection of the presence of any foreign bodies on the surface of a window comprising several sheets formed of a material capable of transmitting an ultrasonic signal.

Referring to FIG. 1, there is seen a conventional automatically controlled cleaning system of windscreen wipers designated by the general reference 1. System 1 comprises windscreen wipers 2 mechanically coupled to a motor 4. When the windscreen wipers are activated, they sweep respectively zones 6, in the form of a circular sector of a windscreen 8. Activating means 10, connected to motor 4, enable the motor to be switched on and/or off.

The automatic control of the windscreen wipers is achieved with the help of the detection device 12, placed facing one of the zones 6. Detection device 12 operates together with a control circuit 14 capable of providing an appropriate control signal to activating means 10 in response to a detection signal originating from detection device 12.

Referring now to FIG. 2, one can see a cross-sectional view of a first embodiment of a window or windscreen 8 according to the invention into which is integrated detection device 12, which provides a detection signal representative of the presence of foreign bodies on the exterior surface of windscreen 8.

Window or windscreen 8 includes a first sheet 16 and a second sheet 18 joined together by a connecting layer 20. In the example described, sheets 16 and 18 are formed of glass, and connecting layer 20 is formed of a polymer such as polyvinyl butadiene (PVB).

According to the invention detection device 12 is placed between sheets 16 and 18 in a recess 22 provided in connecting layer 20 and is directly applied onto a face 24 of sheet 16 opposite a face 26 of the same sheet, face 26 being the face of the window or windscreen in contact with the foreign bodies to be detected. Detection device 12 comprises a piezoelectric transducer 28 used in transmission and reception, for example in the form of a disc, which is provided with excitation electrodes 30, 32, insulated from each other and intended to be connected respectively to control circuit 14 via conductors 34, 36.

Detection device 12 therefore co-operates directly via its transmitting/receiving face comprising electrode 30 with face 24 of the first sheet 20 to detect the presence of foreign bodies on face 24 of the first sheet opposite the first face.

Recess 22 of course exhibits the form and dimensions corresponding to those of detection device 12. In this embodiment, sheet 18 includes a through opening 38 arranged approximately facing recess 26. This opening allows access to face 24 Via recess 22 to enable the installation of detection device 12.

In this regard it will be noted that transducer 28 is fixed by means of a film of glue 40 onto face 24 or by any other appropriate means such as welding. It should be noted that, to avoid parasite reflections and too great an absorption of the ultrasonic signal transmitted by transducer 28 at interfaces transducer 28/film of glue 40 and film of glue 40/sheet 16, film of glue 40 has a very small thickness in relation to wavelength $\lambda$ of the signal emitted by the transducer in sheet 16. Typically, the applicant has determined that the use of a film of glue of a thickness inferior or equal to $\lambda/20$ leads to satisfactory results.

To clarify, with a signal frequency transmitted by the transducer of the order of 4 MHz, a film of glue of a thickness inferior or equal to $15 \times 10^{-6}$ m gives good results.

In order to achieve efficient and uniform transmission and reception of the ultrasonic signals emitted and received by the transducer, care should be taken that no air bubbles are present at the interfaces transmitting the signals.

Opening 38 is closed by a cap 42 across which extend conductors 34, 36 which then run over a face 44 of sheet 18 to connect to control means 14. Cap 42 has a flange 46 which rests on face 4 and a part 48 which penetrates into opening 38. It will be noted that part 48 of cap 42 is of such a length that there is sufficient free space between the free extremity of said part and the face of the transducer carrying electrode 32 for the latter to vibrate satisfactorily.

Cap 42 may be formed for example of a plastic material such as polyvinyl chloride (PVC).

Referring now to FIG. 3, one can see a second embodiment of the invention in which the same elements as those represented in FIGS. 1 and 2 are designated by the same numerical references.

Unlike the first embodiment sheet 18 does not include opening 38 and detection device 12 is placed in recess 22 provided in connecting layer 20 by the instrumentality of a spacer forming a case 50 whose base 52 is partially cut away to allow transducer 28 to vibrate. Spacer 50 keeps detection device 12 pressed against face 24 of sheet 16 and rigidifies sheets 16 and 18 with regard to recess 22. Case 52 also provides protection for detection device 12 and, in particular, protection for the connections of electrodes 30, 32 and conductors 34, 36.

In this embodiment, conductors 34 and 36 extend over face 54 opposite face 44 of sheet 18 as far as control means 14.

To clarify, with a standard asymmetrical window or windscreen, sheet 16, which is intended to come into contact with the interior of the vehicle, typically has a thickness of the order of 2.5 mm, while sheet 18, which is intended to come into contact with the interior of the vehicle, typically has a thickness of 2.0 mm. The connecting layer typically has a thickness of 0.75 mm.

In practice, the invention can therefore be put into operation according to the embodiment, either by adding transducer 26 onto face 24 of sheet 16 having made provision for recess 22 and opening 38 during manufacture of the window or windscreen, or by installing transducer 26 in spacer 50 inside recess 22 for which provision is made in the connecting layer during manufacture of the window or windscreen and closing the recess with the help of sheet 18.

What is claimed is:

1. A window comprising at least a first sheet (16), a second sheet (18), said sheets being joined together by a connecting layer (20), an ultrasonic detection device (12) being placed between said sheets (16, 18) and co-operating directly with a first face (24) of said first sheet (16) to detect the presence of foreign bodies on a second face (26) of said first sheet (16) opposite said first face (24), said device (12) comprising a transducer (28) able to emit, via a transmitting/receiving face, an incidental ultrasonic signal of wavelength $\lambda$ in said first sheet (16), the thickness of said first sheet being equal to $K.\lambda/2$, where K is an integral number, and said transducer being able to receive, via said transmitting/receiving face, a reflected ultrasonic signal representative of the presence or absence of said foreign bodies to generate a detection signal.

2. A window according to claim 1, wherein the connecting layer (20) Comprises a recess (22) in which extends said ultrasonic detection device (12).

3. A window according to claim 2, wherein the second sheet (18) comprises a through opening (38) which extends approximately facing said recess.

4. A window according to claim 3, wherein said opening (38) is closed by a cap (42).

5. A window according to claim 4 in which said ultrasonic detection device comprises a piezoelectric transducer (28) provided with electrodes (30,32) and conductors (34,36) connecting said electrodes (30,32) to a detection circuit, wherein said conductors (34,36) extend across the cap (42) in order then to extend over a face (44) of the second sheet (18).

6. A window according to claim 2, wherein said recess (22) is closed by the second sheet (18).

7. A window according to claim 6, wherein said detection device (12) is placed in a spacer forming a case (50) whose base (52) is partially cut away, said spacer being supported between the first and the second sheet (16,18).

8. A window according to claim 1, wherein said detection device (12) is fixed onto said first face (24) by means of a film of glue (40).

9. A window according to claim 1, wherein said detection device (12) is fixed onto said first face (24) by welding 10. A window according to claim 1, wherein said first sheet (16) is of a first thickness and in that said second sheet (18) has a second thickness different from said first thickness.

* * * * *